US011030200B2

(12) United States Patent
Sadeddin et al.

(10) Patent No.: US 11,030,200 B2
(45) Date of Patent: Jun. 8, 2021

(54) INTEGRATION OF ARTIFICIAL INTELLIGENCE-BASED DATA CLASSIFICATION PROCESSES WITH A PROCUREMENT SYSTEM TO RELATIVIZE AN ENTITY SCORE

(71) Applicant: Coupa Software Incorporated, San Mateo, CA (US)

(72) Inventors: Ahmad Sadeddin, San Francisco, CA (US); Scott Harris, Menlo Park, CA (US); Yutaka Hosoai, San Diego, CA (US)

(73) Assignee: Coupa Software Incorporated, San Mateo, CA (US)

( * ) Notice: Subject to any disclaimer, the term of this patent is extended or adjusted under 35 U.S.C. 154(b) by 596 days.

(21) Appl. No.: 16/020,670

(22) Filed: Jun. 27, 2018

(65) Prior Publication Data

US 2020/0004834 A1    Jan. 2, 2020

(51) Int. Cl.
*G06F 16/2457*    (2019.01)
*G06Q 10/08*      (2012.01)
(Continued)

(52) U.S. Cl.
CPC ........ *G06F 16/24578* (2019.01); *G06F 9/451* (2018.02); *G06F 16/285* (2019.01); *G06N 20/00* (2019.01); *G06Q 10/087* (2013.01)

(58) Field of Classification Search
CPC .. G06F 16/24578; G06F 9/451; G06F 16/285; G06N 20/00; G06Q 10/087
(Continued)

(56) References Cited

U.S. PATENT DOCUMENTS 9,916,562 B1 *  3/2018  Armato ............... G06Q 10/087
10,318,503 B1 * 6/2019  Swamy ............... G06F 16/2428
(Continued)

OTHER PUBLICATIONS

Coupa Software Inc., "Coupa Acquires Spend360 to Modernize Processes for Data Analysis" Press Releases, dated Jan. 10, 2017, 4 pages.

*Primary Examiner* — William D Titcomb
(74) *Attorney, Agent, or Firm* — Baker Botts L.L.P.

(57) ABSTRACT

Technologies for computing a relativized entity score include generating first actionable output that identifies a particular supplier and an intrinsic score for the particular supplier that is calculated using intrinsic factor data for the particular supplier, where the intrinsic factor data is obtained from a plurality of instances of procurement software; determining a set of weights using peer spend data of a set of peer suppliers, where the set of peer suppliers is identified based on a spend label that is associated with the peer spend data by an artificial intelligence-based process; applying the set of weights to a set of intrinsic scores for the set of peer suppliers to produce a set of peer scores, where a weight in the set of weights is calculated using the peer spend data; aggregating the set of peer scores to produce an aggregate peer score; generating second actionable output, where the second actionable output modifies or supplements the first actionable output based on a comparison of the intrinsic score for the particular supplier to the aggregate peer score, where the method is performed by one or more computing devices.

20 Claims, 9 Drawing Sheets

(51) Int. Cl.
  *G06F 9/451* (2018.01)
  *G06N 20/00* (2019.01)
  *G06F 16/28* (2019.01)

(58) Field of Classification Search
  USPC .......................................................... 706/12
  See application file for complete search history.

(56) References Cited

U.S. PATENT DOCUMENTS

| | | | |
|---|---|---|---|
| 10,346,762 B2* | 7/2019 | Greenspan | G06F 16/2465 |
| 10,387,894 B2* | 8/2019 | Akkiraju | G06Q 30/0251 |
| 10,452,652 B2* | 10/2019 | Hernandez Sanchez | G06F 16/22 |
| 10,453,144 B1* | 10/2019 | McRae | G06Q 40/06 |
| 10,600,004 B1* | 3/2020 | Misko | G06N 7/005 |
| 10,606,856 B2* | 3/2020 | Bath | G06F 3/0481 |
| 10,614,363 B2* | 4/2020 | Libert | G06F 16/2465 |
| 10,706,113 B2* | 7/2020 | Lundin | G06F 16/9535 |
| 10,832,262 B2* | 11/2020 | Khabazian | G06Q 30/0201 |
| 10,956,506 B1* | 3/2021 | McCormick | G06F 16/90335 |
| 2017/0090867 A1* | 3/2017 | Lifar | G06F 16/9535 |
| 2017/0186060 A1* | 6/2017 | Morris | G06Q 30/0633 |
| 2019/0258807 A1* | 8/2019 | DiMaggio | G06N 20/00 |
| 2019/0295113 A1* | 9/2019 | Bharti | G06Q 30/0201 |
| 2020/0090196 A1* | 3/2020 | de Saint Leger | G06Q 30/0201 |
| 2020/0226012 A1* | 7/2020 | Pitre | G06F 16/55 |
| 2021/0103957 A1* | 4/2021 | Zheng | G06Q 30/0277 |

\* cited by examiner

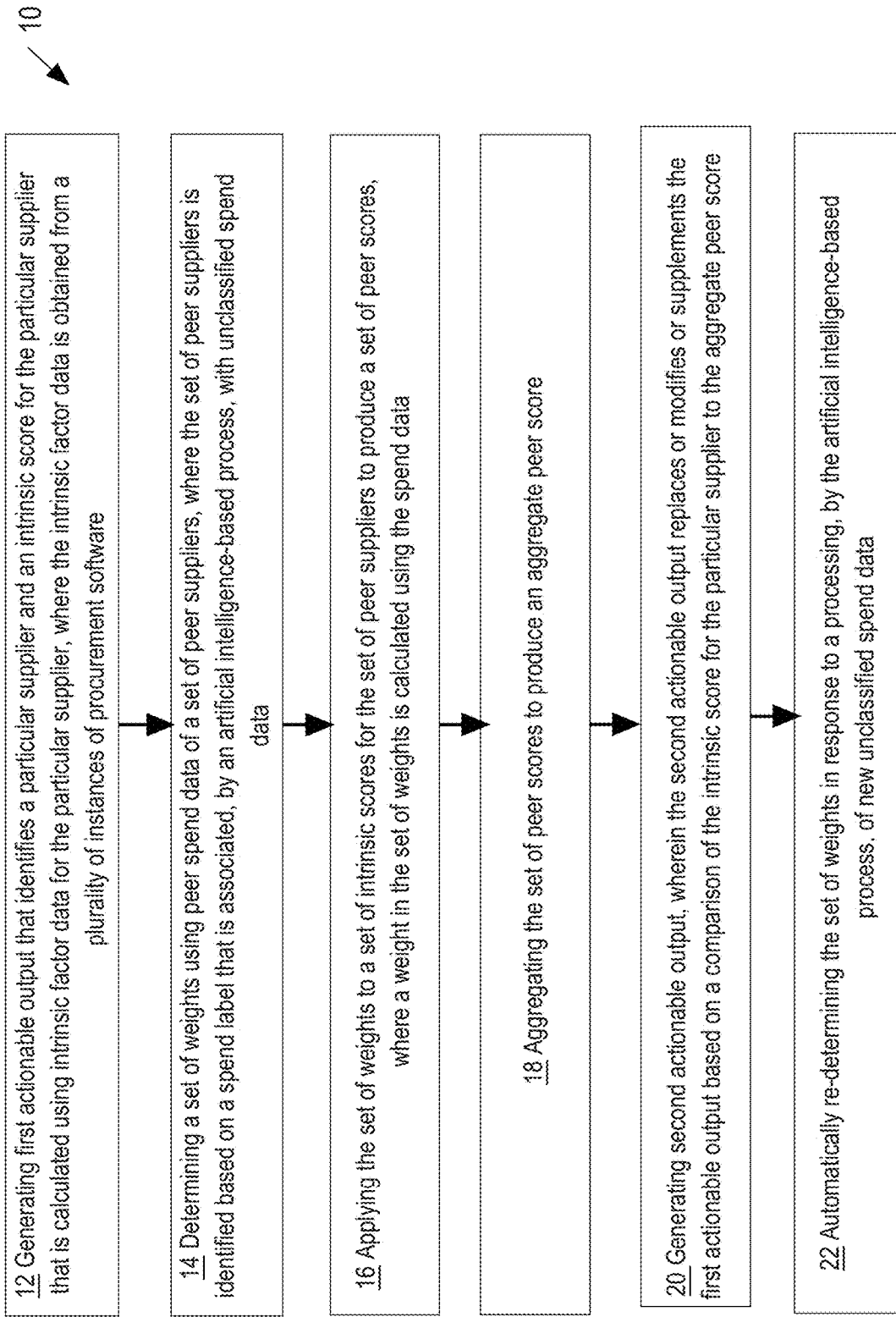

US 11,030,200 B2

INTEGRATION OF ARTIFICIAL INTELLIGENCE-BASED DATA CLASSIFICATION PROCESSES WITH A PROCUREMENT SYSTEM TO RELATIVIZE AN ENTITY SCORE

TECHNICAL FIELD

The present disclosure relates to networked data processing systems, and more particularly to computer software that facilitates electronic procurement transactions between entities on a network.

BACKGROUND

Electronic procurement systems manage transactional data processing tasks, including creating, storing, and managing data and communications related to procurement transactions between entities on a network. In a networked procurement system, the users of multiple different entity computers across the network create and store data in the system at the same time or at different times using different instances of procurement software.

A limitation of existing procurement systems is that data created and stored by different instances of the procurement software can be incomplete, duplicative, or even inaccurate in some cases, or the data may have been input using different naming conventions or different terminology, or have other data hygiene and/or data integrity problems. These and issues have made it challenging to aggregate transactional data across multiple instances of procurement software, which in turn has made it difficult to perform data analytics on the aggregated data and to use output of the data analytics to improve the software functionality.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1A is a flow diagram that depicts a process for generating actionable output, in an embodiment;

DETAILED DESCRIPTION

Figure 1B:
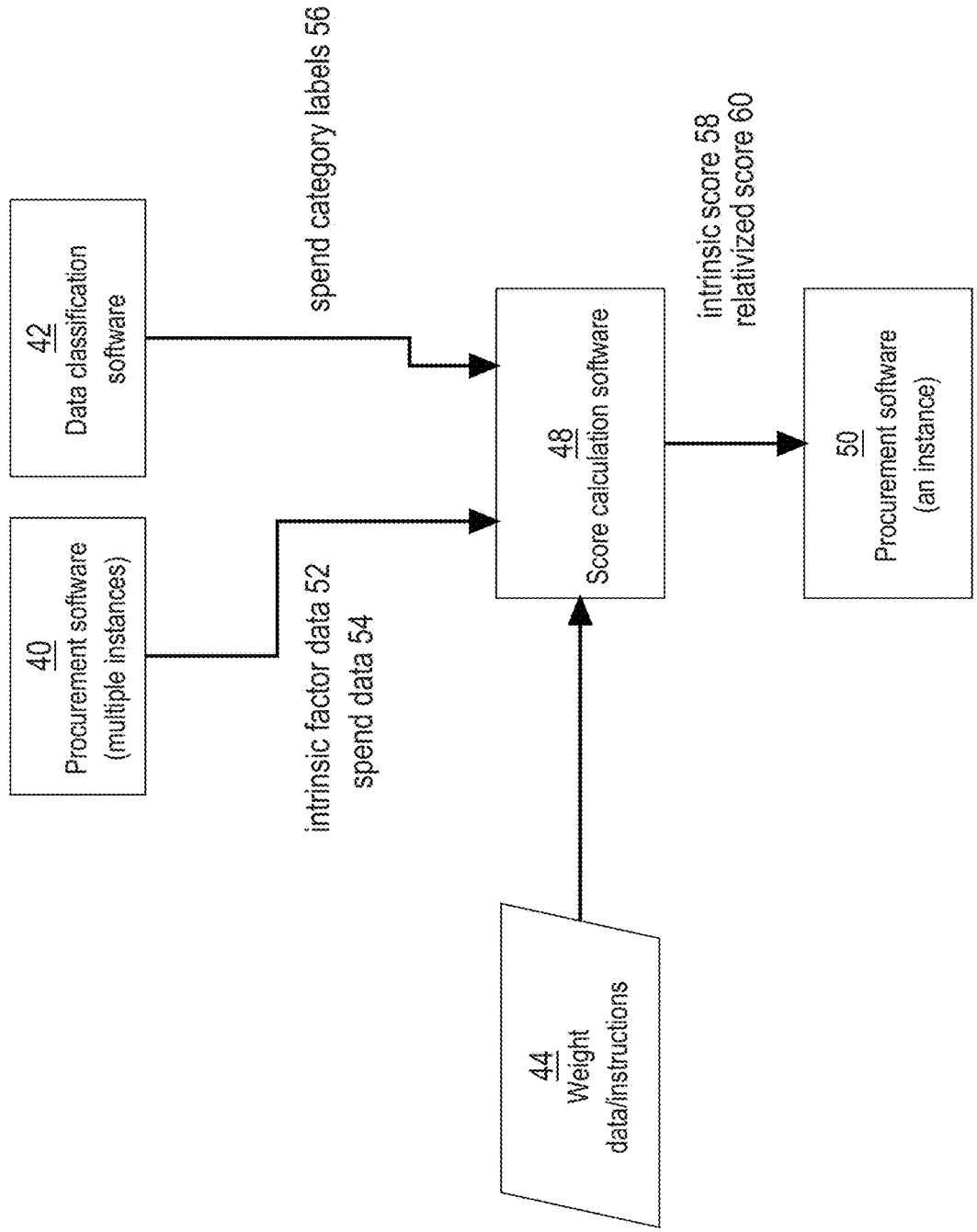
FIG. 1B is a block diagram that depicts an arrangement of software components, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In a cloud-based procurement system, transactional data spans many instances of procurement software running on many different computers on a network. A technical limitation of existing procurement systems is that data classification processes, when used at all, are slow and inaccurate. This is due to the constraints of the system architecture as well as data hygiene and data integrity issues. As a result, the transactional data collected by cloud-based procurement systems remains underutilized. Using the prior techniques, sophisticated data analysis techniques cannot be performed efficiently on disparate transactional data that is produced in many different instances of procurement software.

The disclosed approaches integrate artificial intelligence-based (AI-based) data classification processes with a procurement system to produce aggregated transactional data in a manner that is more reliable, accurate and efficient than previously used techniques. In a particular application, the disclosed approaches compute relativized entity scores using labels that are provided by AI-based data classification processes that create associations of the labels with various portions of transactional data. The relativized entity scores are used by the procurement system to generate and replace or modify or supplement actionable output that drives downstream software processes.

Actionable Output Based on Relativized Score Data

FIG. 1A is a flow diagram that depicts a process 10 that may be performed by one or more components of a computing system 100, shown in FIG. 1C, described below. Computing system 100 or portions thereof may be referred to herein as "procurement system." For example, portions of process 10 may be performed by procurement computer(s) 102 and/or data analysis computer(s) 112 and/or score calculation computer(s) 120 and/or computing device 160 and/or display device 170, shown in FIG. 1C and described below. Any combination of such devices performing the process 10 may be considered a procurement system for purposes of a particular implementation of the disclosed approaches.

Portions of process 10 may be performed by a single entity or program or by multiple entities or programs, including for example a browser plug-in and a remote server. The operations of process 10 as shown in FIG. 1A can be implemented using processor-executable instructions that are stored in computer memory. For purposes of providing a clear example, the operations of FIG. 1A are described as performed by computing device(s) 110, 160, which may be individually or collectively referred to simply as 'computing system' or 'procurement system.'

Figure 2A:
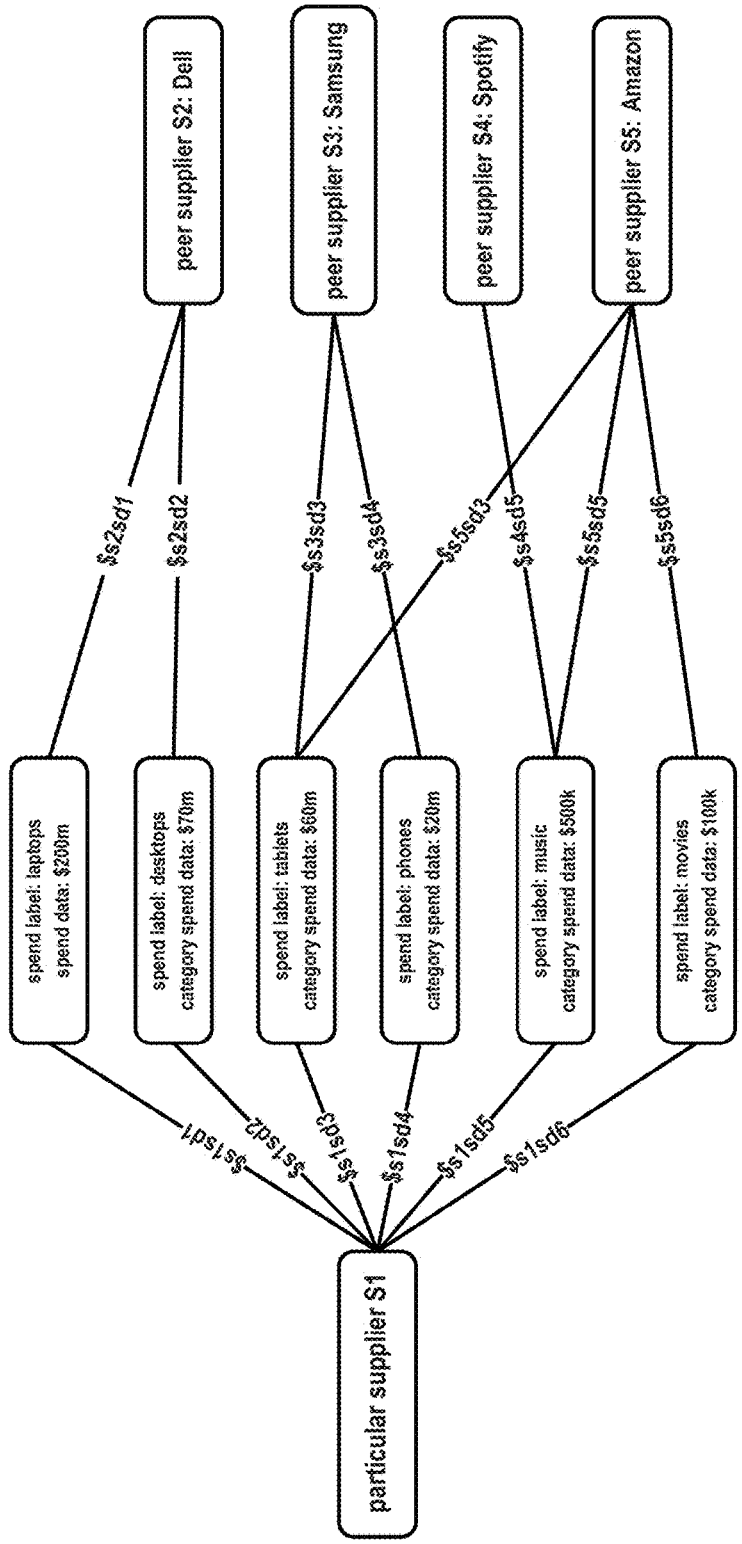
FIG. 2A is a graph-based representation of output of an AI-based process, in an embodiment.
Figure 2B:
FIGS. 2B and 2C are screen captures illustrating actionable output, in an embodiment.

In operation 12, process 10 generates first actionable output that identifies a particular supplier entity and an intrinsic score for the particular supplier entity. Actionable output is output that causes the computing system to perform a subsequent action, either autonomously or in response to an input. Actionable output includes, in some embodiments, an interactive graphical user interface element and/or an instruction to initiate a particular downstream computer process, such as an online approval process or an online questionnaire. In an embodiment, first actionable output includes a user interface element that is indicative of the intrinsic score for the particular supplier identified in operation 12. An example of a display of first actionable output is shown in FIG. 2B, described below.

In an embodiment, the particular supplier entity is a particular supplier of goods or services, such as commodities, that can be ordered through a cloud-based procurement system by other entities, such as buyer entities. In an embodiment, supplier entities and buyer entities are set up with user accounts that are registered in the procurement system. An instance of the procurement software is generated on a particular procurement computer used by a registered buyer entity or a registered supplier entity, for example in response to a launch request received from a particular user account of the particular supplier entity or buyer entity.

The intrinsic score for the particular entity is calculated using intrinsic factor data for the particular entity. Intrinsic factor data is derived from transactional data that is obtained from a number of different instances of procurement software on a network, in an embodiment. Examples of intrinsic factor data include metric data such as a number or dollar amount of: invoice disputes and/or overages and/or rejected invoices.

In an embodiment, intrinsic factor data additionally includes star ratings data that represents a subjective measure of a degree to which a particular buyer entity registered in the procurement system is satisfied with a product or service that the buyer entity purchased from the particular supplier. The star ratings data is obtained from the various instances of procurement software used by registered users of buyer entities, for example though a graphical user interface in which the buyer entity inputs information about their experience transacting with a particular supplier.

In operation 14, process 10 determines a set of weights using peer spend data of a set of peer suppliers. The set of peer suppliers is identified based on a spend label that is associated, by an artificial intelligence-based process, with unclassified spend data. The spend label is also associated with spend data of the particular supplier. In an embodiment, the spend label represents a category of products or services in which both the particular supplier and the peer suppliers sell products or services to buyer entities.

In an embodiment, the AI-based process infers that a particular spend label is associated with a particular supplier entity by identifying patterns in the transactional data received from the procurement system. The AI and comparing the identified patterns to known patterns established by training data. For example, the AI-based process recognizes item-level data such as product make and model as having a high likelihood of being associated with a particular spend label (such as laptops, desktops, tablets) because it has been trained to do so through a machine learning process that uses as input a large dataset in which the desired associations are already known (e.g., a supervised machine learning process).

When the AI-based process recognizes a pattern of purchases of items from a particular supplier entity by buyer entities in the procurement system, and the AI-based process recognizes that the pattern of purchases is associated with a particular spend label, the AI-based process creates an association of the supplier entity with the spend label. In an embodiment, the pattern of purchases is defined by a threshold number of purchases of a certain item or a certain item type within a given time interval.

Use of the AI-based processes allows portions of the transactional data produced by the various instances of the procurement system to be homogenized without using heuristic rules, which tend to get complex and difficult to manage for large sets of disparate data, and without significant manual effort, which introduces inefficiencies and labeling inconsistencies due to subjective classifications. An example of a graphical representation of output produced by the AI-based process, in an embodiment, is shown in FIG. 2A, described below.

Spend data is data that indicates an amount (in dollars or other currency) that the procurement system has determined has been spent by buyer entities registered in the procurement system on purchases of a particular spend item from a particular supplier entity registered in the procurement system. Spend data is collected and stored by the procurement system during normal operations of the multiple instances of procurement software across the network.

A spend item is a product or service, such as a commodity. The AI-based process applies machine learning-based techniques and/or neural network-based techniques, for example, to the spend data to classify the spend data according to spend labels. A spend label is a data item that represents a category of spend items. For example, a spend item is a particular make and model of a product, a spend category is a word or phrase that describes a group of similar or related items, and a spend label is a data item that corresponds to the spend category. A spend label can be a text-based label that is the same as the spend category or a code that is linked to the spend category in a database. Examples of spend labels are laptops, mobile phones, and legal services.

In operation 16, process 10 applies the set of weights determined in operation 14 to a set of intrinsic scores for the set of peer suppliers to produce a set of peer scores. An intrinsic score for a peer supplier is computed in a similar manner as the intrinsic score for the particular supplier, described above, using intrinsic factor data for a peer supplier, which is similar to intrinsic factor data for the particular supplier, described above. A weight in the set of weights is calculated for a particular peer supplier using spend data for the particular peer supplier and spend data for other supplier entities in the set of peer suppliers and spend data for the particular supplier identified in operation 12.

Figure 2C:
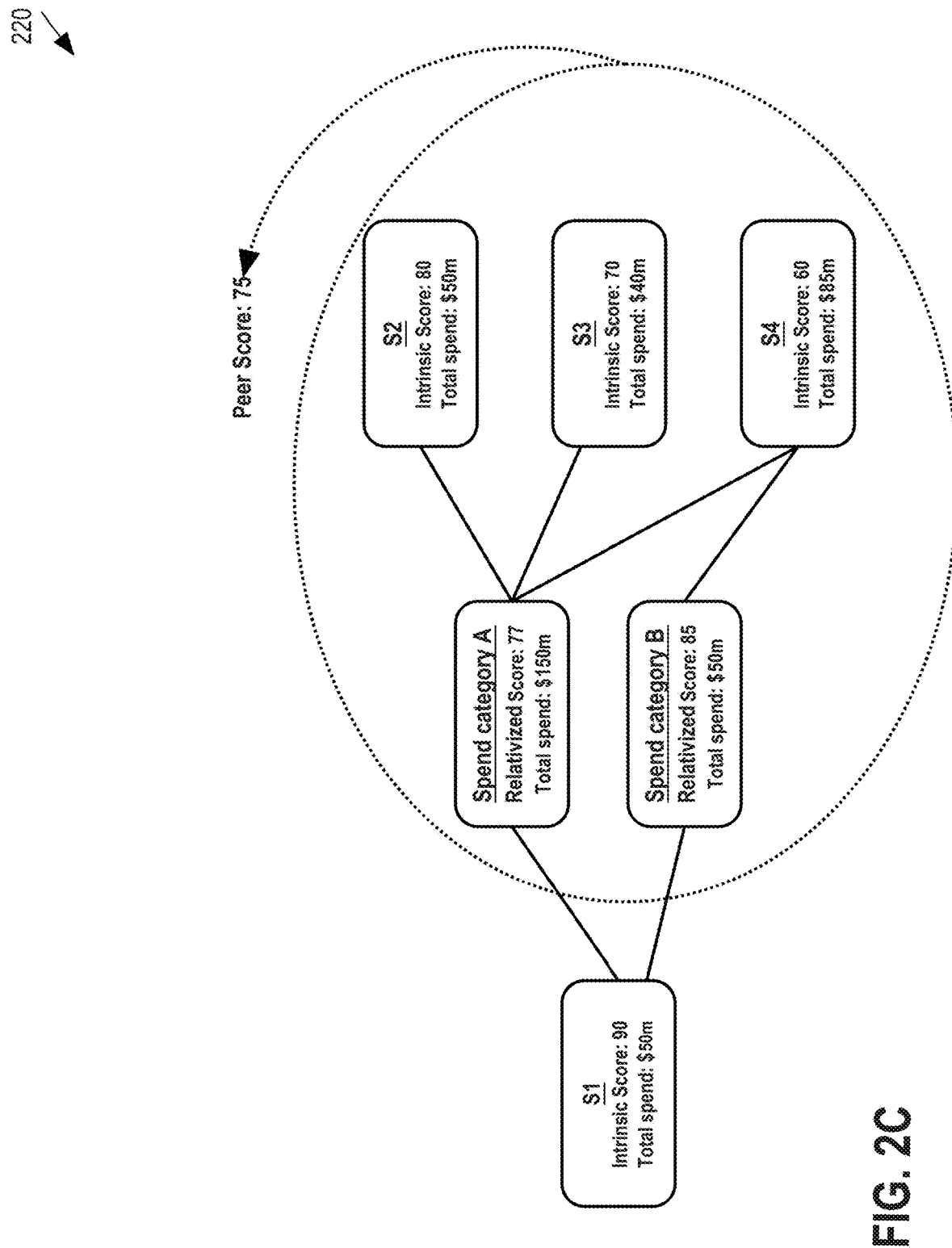
Figure 3A:
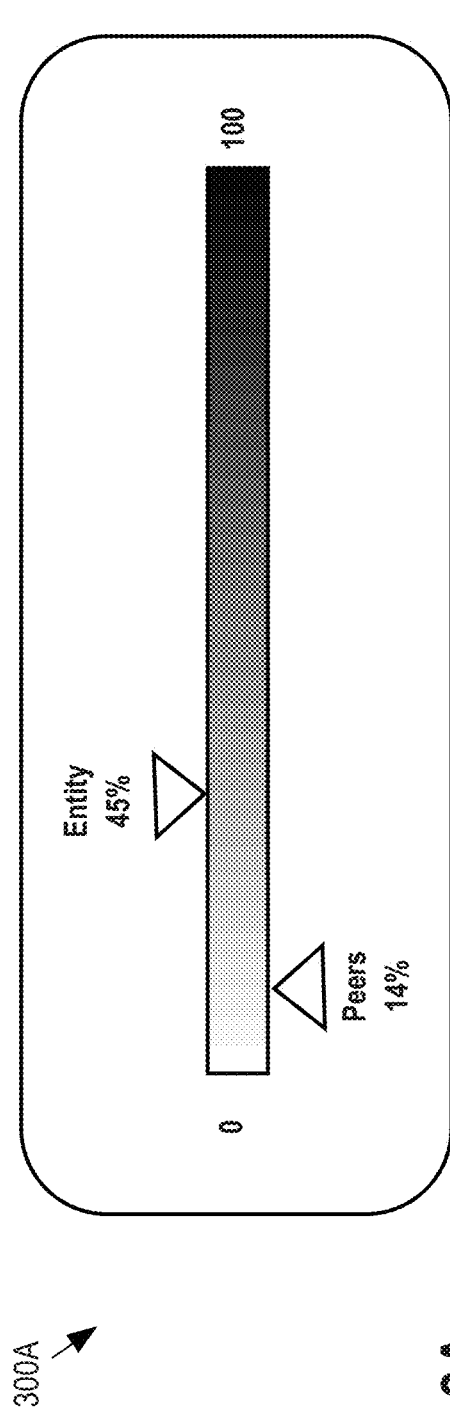
FIGS. 3A and 3B are a screen captures illustrating actionable output, in an embodiment.
Figures 4A, 4B:
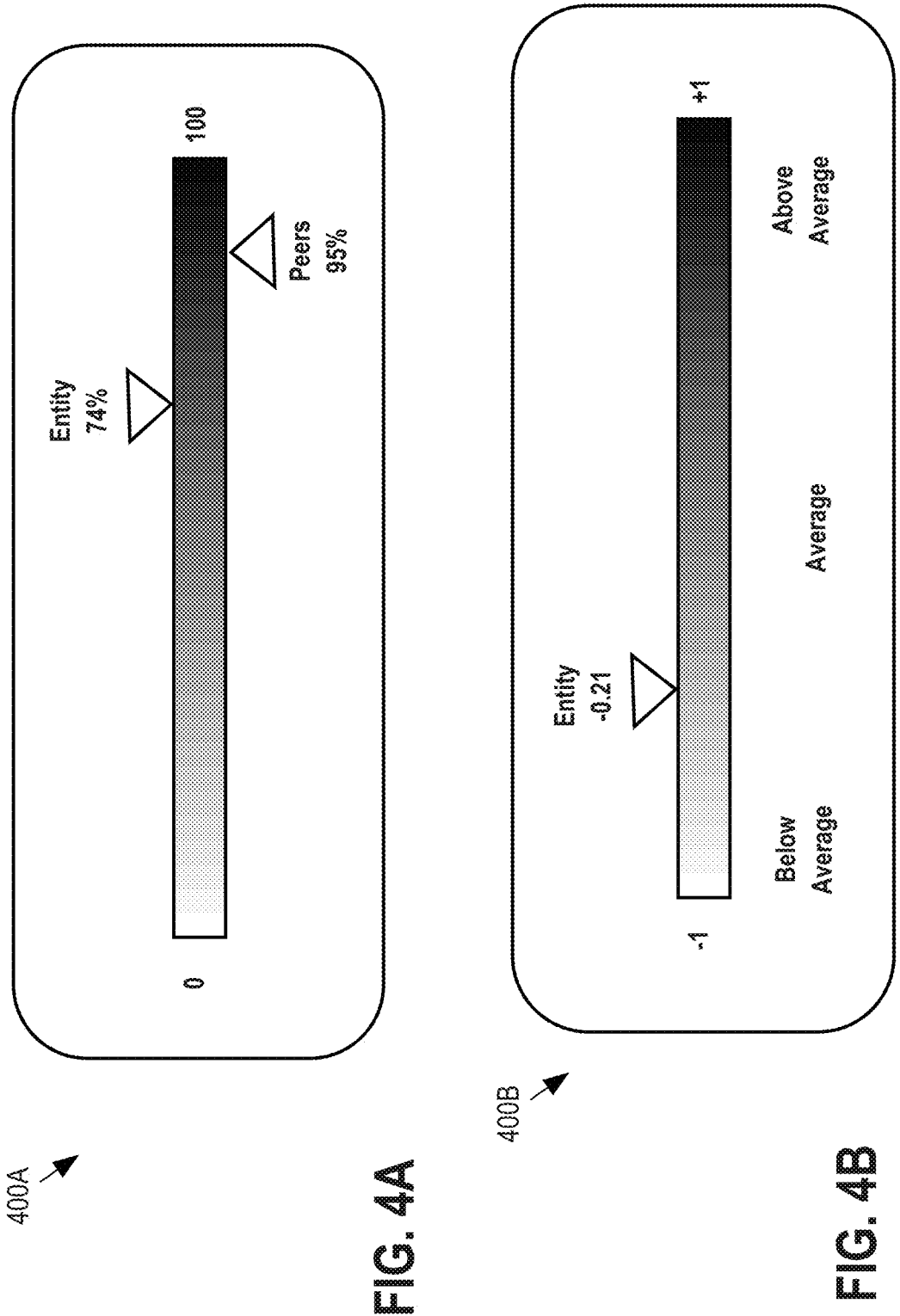
FIGS. 4A and 4B are a screen captures illustrating actionable output, in an embodiment.

In operation 18, process 10 aggregates the set of peer scores to produce an aggregate peer score. In an embodiment, the peer scores determined in operation 16 are summed for all of the peer entities in the set of peer entities across all spend labels that are associated with the particular supplier identified in operation 12. In some embodiments, the peer scores are aggregated for a particular spend label or group of spend labels. Thus, an aggregate peer score can represent the peer score for a particular category of spend items (for example, laptops) in which the particular supplier sells items, or the peer score for a group of categories (for example, laptops and tablets) or the peer score for all of the spend categories associated with the particular supplier entity. Examples of displays of aggregate peer scores are shown in FIGS. 2C, 3A, and 4A, described below.

In operation 20, process 10 generates second actionable output. The second actionable output replaces or modifies or supplements the first actionable output based on a comparison of the intrinsic score for the particular supplier to the aggregate peer score. In an embodiment, generating the second actionable output includes displaying user interface elements that are indicative of the comparison of the intrinsic score for the particular supplier to the aggregate peer score. In some embodiments, generating the second actionable output includes, in response to the comparison of the intrinsic score for the particular supplier to the aggregate peer score, (i) initiating an online approval process or (ii) calibrating risk score data or (iii) initiating an online questionnaire process or (iv) initiating an online opportunity notification process. Examples of displays of second actionable output are shown in FIGS. 2C, 3A, 3B, 4A, 4B.

In operation 22, process 10 automatically re-determines the set of weights that were determined in operation 14, in response to a processing of new unclassified data by the artificial intelligence-based process of operation 14. New unclassified data includes spend data for a spend item in the procurement system that has not been previously classified by the AI-based process. New unclassified data includes, for example, spend data for a new make or model of a product or a product not previously purchased by registered buyer entities of the procurement system. New unclassified data also includes, for example, new spend data for previously classified products. New unclassified data can influence the spend labels and the associations between spend labels and supplier entities that are made by the AI-based process. Thus, the output of the AI-based process operating on the new unclassified data influences the determination of the set of peer suppliers, which in turn influences the set of weights.

Integration of Data Classification with Procurement System

FIG. 1B is a block diagram that depicts an example software-based system for calculating entity scores, in an embodiment. The software-based components of the system of FIG. 1B include procurement software 40, 50 (multiple instances), data classification software 42, weight data/instructions 44, score calculation software 48.

In an embodiment, score calculation software 48 is implemented as a component of procurement/classification (P/C) interface 124, shown in FIG. 1C, described below. In an embodiment, score calculation software 48 includes intrinsic score calculation software 122 and relativized score calculation software 126, shown in FIG. 1C. In another embodiment, score calculation software 48 includes relativized score calculation software 126 while intrinsic score calculation software 122 is contained within procurement software 40, 50.

Procurement software 40, 50 is software that collects, stores and manages transactional data related to procurement transactions between buyer entities and supplier entities that have user accounts registered in the procurement software 40. Multiple instances of procurement software 40 include, for example, different instances operated by different buyer entity and supplier entity user accounts. An instance of procurement software 50 includes, for example, one of the instances 40; for example, an instance operated by a buyer entity user account. Examples of procurement software 40, 50 are the UNIFIED SPEND PLATFORM and COUPA PROCUREMENT software solutions provided by Coupa Software of San Mateo, Calif.

Data classification software 42 is software that is designed to provide AI-based classifications of transactional data. Data classification software 42 performs the operations that are described as being performed by AI-based processes in the discussion of FIG. 1A, above. An example of data classification software 42 is SPEND360, available from Coupa Software.

While in some embodiments the SPEND360 data classification software from Coupa Software performs the AI-based processes to provide the AI-based classifications of the transactional data, other data classification software is used provide the AI-based classifications in other embodiments. In these other embodiments, any suitable data classification software capable of performing the operations that are described above as being performed by AI-based processes may be used. As such, some embodiments are not limited to any particular data classification software or any particular provider of data classification software.

Score calculation software 48 is coupled to procurement software 40, 50 and data classification software 42, for example by network 140 of FIG. 1C, described below. Score calculation software 48 performs the score calculation operations and related operations, such as weight determination computations, as described in the discussion of FIG. 1A, above. In doing so, score calculation software 48 utilizes inputs including intrinsic factor data 52 and spend data 54 obtained from procurement software 40, as well as spend category labels 56 obtained from data classification software 42. In determining the set of weight values, score calculation software 48 uses weight data and/or instructions 44.

Weight data/instructions 44 includes stored data values used in the calculation of intrinsic scores, as well as computed data values used in the calculation of the relativized score 60. In an embodiment, computation of intrinsic score 58 includes multiplying each intrinsic factor data by a weight value, and summing the weighted intrinsic factor data. In an embodiment, a formula for computing intrinsic score 58 is, for a particular supplier: $idm*w1+om*w2+rm*w3+sr*w4$, where idm is the invoice dispute metric, w1 is the weight value applied to the invoice dispute metric, om is the overage metric, w2 is the weight value applied to the overage metric, rm is rejected invoices metric, w3 is the weight value applied to the rejected invoices metric, sr is the star ratings metric, and w4 is the weight value applied to the star ratings metric. The weight values w1, w2, w3, w4 are numerical values between 0 and 1, in an embodiment. The weight value w4 includes a log of a number of star ratings, in an embodiment. In an embodiment, for each metric, 1 minus the metric data value is used in the above formula, rather than the raw metric data value.

In one particular embodiment, the invoice dispute metric, the overage, and rejected invoices metric are computed by taking the logarithm based on the number of invoices that a particular customer has for a particular supplier, so that as more invoice data becomes available, the metrics and resulting scores become more reliable as well. In one example, the intrinsic score is computed by taking the log 20 of the total invoice count for the customer with the particular supplier, as follows: intrinsic score $(c1*\log 20(\text{invoice\_count})*(1-\text{invoice\_dispute\_rate}))+(c2*\log 20(\text{invoice\_count})*(1-\text{overage\_rate}))+(c3*\log 20(\text{invoice\_count})*(1-\text{rejected\_rate}))$, where c1, c2, and c3 are numerical values between 0 and 1, and $w1=c1*\log 20(\text{invoice\_count}$; $w2=c2 \log 20(\text{invoice\_count})$; $w3=c3*\log 20(\text{invoice\_count})$.

The weight values are adjustable depending on the requirements of a particular design of the system. In one embodiment, the weight value w2 is higher than both w1 and w3 (or more particularly, c2 is higher than both c1 and c3), so that dispute rate is a bigger determinant of the overall intrinsic score.

In some embodiments, where the supplier's invoice_count is low relative to other suppliers in the same community, the low invoice_count is considered an indicator of lower credibility. In an embodiment, the threshold for determining whether a supplier's invoice_count is low is 1000 invoices, such that suppliers with less than 1000 invoices are assigned the low invoice_count status. In these cases, the average of the intrinsic scores of more experienced suppliers (e.g., suppliers with more than 1000 invoices) is calculated first, and then this average score is set as the maximum reachable score for the low invoice_count suppliers. As a result, the low invoice_count supplier scores will still be meaningful without exceeding the average score of the higher invoice_count suppliers.

To compute the star rating metric, in one particular embodiment, a rating of 75/100 is considered a neutral rating for purposes of the intrinsic score calculations. Any score below the neutral rating is considered as a negative rating and would negatively affect the intrinsic score. Likewise, any score above the neutral rating is considered as a positive rating and would have a positive effect on the intrinsic score.

In a particular embodiment, the rating metrics is computed by taking the log 20 of the raw rating metric value, then divide that result by c4, a numerical value that is determined based on experimentation, so that the rating metric falls within a desired range, i.e., does not have more than a certain amount of impact either positively or negatively on the overall intrinsic score. This desired range is adjustable based on the requirements of a particular design of the system. One example of a design requirement is that the minimum/maximum effect on the intrinsic score of the supplier's ratings metric is −5 or +5 when the maximum intrinsic score for the supplier is 100. Other implementations allow the ratings metric to have a lesser or greater impact on the intrinsic score.

In an embodiment, computation of relativized score 60 includes, for a particular supplier entity, multiplying the intrinsic score 58 for that supplier entity by a weighted average of that particular supplier's spend data. The relativized score 60 can be computed for a particular spend category or across multiple spend categories. In an embodiment, a formula for computing relativized score 60 is: $sum(ps1*W1, \ldots psN*WN)$, where $ps1 \ldots psN$ are the peer supplier entities involved in the computation and $W1 \ldots WN$ are the weight values corresponding to the respective peer supplier, where a particular weight value $W1 \ldots WN$ is computed as a ratio: total spend for the peer supplier in a spend category divided by (the total spend for all peer suppliers in that spend category minus the particular supplier's spend in that spend category).

Score calculation software 48 outputs one or more of intrinsic score 58 and relativized score 60 for use by procurement software 50 in generating actionable output as described above.

Networked System Example

Figure 1C:
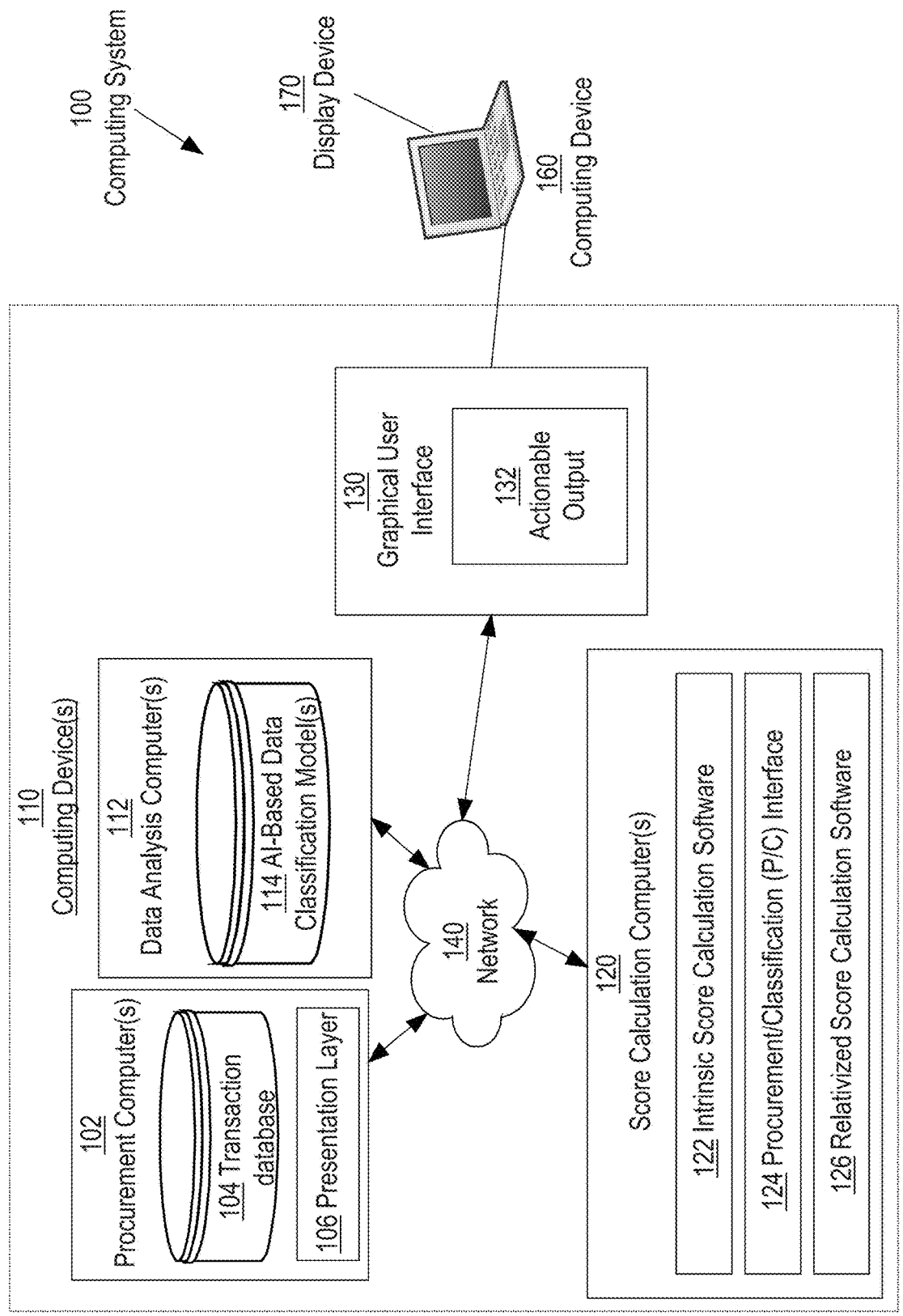
FIG. 1C is a block diagram of a computing system, in an embodiment.

FIG. 1C is a block diagram of a networked computing system in which the score calculation software may be implemented, for example as part of an interface between procurement software and a data analysis system, or as part of procurement software, or as part of data analysis software.

Computing system 100 includes at least computing device(s) 110, computing device 160, and display device 170, which are communicatively coupled to an electronic communications network 140. All or portions of computing system 100 may be referred to in this disclosure as procurement system. Implemented in the devices 110, 160, 170 using computer software, hardware, or software and hardware, are combinations of automated functionality embodied in computer programming code, data structures, and digital data, which are represented schematically in FIG. 1 as procurement computer(s) 102, transaction database 104, presentation layer 106, data analysis computer(s) 112, AI-based data classification model(s) 114, score calculation computer(s) 120, intrinsic score calculation software 122, procurement/classification interface 124, relativized score calculation software 126, graphical user interface 130, actionable output 132. System as used in this disclosure may refer to a single computer or network of computers and/or other devices. Computing device as used in this disclosure may refer to a computer or any other electronic device that is equipped with a processor.

Although computing system 100 may be implemented with any number N (where N is a positive integer) of procurement computer(s) 102, data analysis computer(s) 112, AI-based data classification model(s) 108, score calculation computer(s) 120, intrinsic score calculation software 122, graphical user interface 130, computing device(s) 110, display device 170 and computing device 160, respectively, in this disclosure, these elements may be referred to in the singular form for ease of discussion.

Also, procurement computer(s) 102, data analysis computer(s) 112, AI-based data classification model(s) 114, score calculation computer(s) 120, graphical user interface 130 are shown as separate elements in FIG. 1 for ease of discussion but the illustration is not meant to imply that separation of these elements is required. The illustrated systems (or their functionality) may be divided over any number of physical systems, including a single physical computer system, and can communicate with each other in any appropriate manner.

The illustrative procurement computer(s) 102, data analysis computer(s) 112, AI-based data classification model(s) 114, score calculation computer(s) 120, graphical user interface 130 and their respective software components are communicatively coupled to computing device 160 and to network 140. Portions of procurement computer(s) 102, data analysis computer(s) 112, AI-based data classification model(s) 114, score calculation computer 120(s), graphical user interface 130 may be implemented as web-based software applications or mobile device applications and hosted by a hosting service (not shown). For example, graphical user interface 130 may be implemented within a front-end portion of a procurement computer 102 or a data analysis computer 112 or a score calculation computer 120, or embedded within another application. In an embodiment, portions of graphical user interface 130 are implemented in a web browser or a mobile device application that can execute on computing device 160.

In some embodiments, computing device 160 is a client computing device, such as an end user's smart phone, tablet computer, mobile communication device, wearable device, smart appliance, desktop computer, or laptop machine, and computing device 110 is a server computer or network of server computers located on the Internet, in the cloud. As illustrated in FIG. 1, display device 170 is implemented in computing device 160 but may be implemented as a separate device or as part of another device, or as multiple networked display devices, in other implementations.

The example presentation layer 106 of procurement computer 102 is a server-side web application framework that generates graphical user interface 130 and through which procurement software 40 and transaction data 52, 54, described above, are made accessible to registered users of buyer entities and supplier entities. Transaction database 104 is a database that stores transaction data 52, 54. Transaction data 52, 54 includes an event-specific or entity-specific subset of the data stored in transaction database 104. Transaction database 104 is implemented as a searchable database system, such as a graph-based database system or a table-based relational database system or a hierarchical database system. The stored transaction data 52, 54 may include numerous data records, where each data record may indicate, for example, an entity name, a spend item identifier and description, cost information, invoice information, delivery information, including but not limited to the spend data and the intrinsic factor data described above.

Data analysis computer 112 includes AI-based data classification model(s) 114 and, while not specifically shown in FIG. 1C, data classification software 42. AI-based data classification model(s) 114 include classification algorithms and data structures that store information about relationships between spend data and spend labels, as described above. An example of a relationship is a probabilistic measure of a strength of association of a particular spend label with a particular item of spend data; in other words, a likelihood that a particular spend label is an accurate classification of the particular item of spend data. These relationships are established by running the AI-based classification algorithm(s) on large amounts of transaction data stored in transaction database 104, for example using a machine learning-based technique or a neural network-based technique. Portions of AI-based data classification model(s) 114 and/or associated data and algorithms are stored in a data structure, such as a graph-based database system or a relational database system.

Score calculation computer 120 is operatively coupled to procurement computer 102 and data analysis computer 112. Score calculation computer 120 includes intrinsic score calculation software 122, procurement/classification (P/C) interface 124, and relativized score calculation software 126. In an embodiment, the software components of score calculation computer 120 are implemented as part of procurement computer 102. Intrinsic score calculation software 122 generates the intrinsic scores 58, as described above. Relativized score calculation software 126 generates the relativized scores 60, as described above. Procurement/classification (P/C) interface 124 provides a programmable interface through which procurement computer(s) 102 and data analysis computer(s) 112 bidirectionally communicate data and/or computer instructions including data and instructions for calculating intrinsic scores 58 and relativized scores 60.

Network 140 is an electronic communications network and may be implemented on any medium or mechanism that provides for the exchange of data between the devices that are connected to the network. Examples of network 140 include, without limitation, a network such as a Local Area Network (LAN), Wide Area Network (WAN), Ethernet or the Internet, or one or more terrestrial, satellite, wireless, or optical links.

Computing device 160 communicates with display device 170 and operates graphical user interface 130 to establish logical connection(s) over network 140 with portions of procurement computer 102, data analysis computer 112, score calculation computer 120, either directly or via P/C interface 124. Actionable output 132 includes a digital presentation of data and/or instructions. Examples of digital presentations include interactive graphical user interface (GUI) elements that can be displayed on a display screen or included in an electronic message, such as a push message, an email message, voice-based output generated by text-to-speech (TTS) software, or another form of electronic communication. Actionable output 132 can be embedded in an email message or a text message or a web-based application front end, for example an HTML (Hyper-Text Markup Language) document, or a mobile device application running on a mobile device operating system.

Identification of Peer Entities by AI-Based Process

FIG. 2A is a graph-based representation of output 200 of an AI-based process, in an embodiment. The output includes a supplier node S1, a set of peer supplier nodes S2-S5, and a set of spend label nodes. The spend label nodes represent spend categories determined by the AI-based process. The spend label nodes also indicate the total spend amount in a particular spend category across all suppliers.

The spend label nodes are connected to the supplier node S1 by a first set of edges denoted by the $s1sdN edge label, where sdN represents, for a particular edge, a spend label node coupled to node S1 by the particular edge. A data value associated with the edge label $s1sdN is the amount of spend data of supplier S1 that is associated by the AI-based process with the particular spend label. Thus, the edges between supplier S1 and the spend label nodes represent the distribution of S1's spend data across all of the spend labels in the graph.

The spend label nodes are connected to the peer supplier nodes by a second set of edges denoted by $sMsdN, where sM represents a particular peer supplier node and sdN represents a particular spend label node. A data value associated with the $sMsdN edge label is the amount of spend data of the particular peer supplier sM that is associated by the AI-based process with the particular spend label. Thus, the edges between the peer supplier nodes and the spend label nodes represent the distribution of each peer supplier's spend data across all of the spend labels in the graph.

It can be seen from the example graph of FIG. 2A that this particular use of AI-based process identifies different sets of peer suppliers for the different sets of spend categories in which the particular supplier S1 operates. As a result, the system can compare apples to apples, so to speak, by generating relativized scores based on particular spend categories or set of spend categories. These spend category-relativized scores are likely more meaningful than supplier-level scores as they reflect the characteristics of the spend data that is specific to those categories. This level of granularity can be very useful because the customs and market behaviors of the participants often varies from spend category to spend category.

Generation of Actionable Output

FIGS. 2B and 2C are screen captures illustrating second actionable output, in an embodiment. FIG. 2B shows an example of first actionable output 210, which includes an intrinsic score calculated for a supplier as described above. The intrinsic score by itself has limited usefulness because it lacks context. FIG. 2C is an example of graph-based output 220 that includes relativized scores for particular spend categories and an aggregate peer score for all peer suppliers in the identified spend categories, calculated as described above. FIG. 2C includes both intrinsic scores and relativized scores, which enables a comparison of a particular supplier's intrinsic score to the relativized scores in each spend category and also to the aggregate peer score.

Use Case: Positive Relativized Entity Score

Figure 3B:
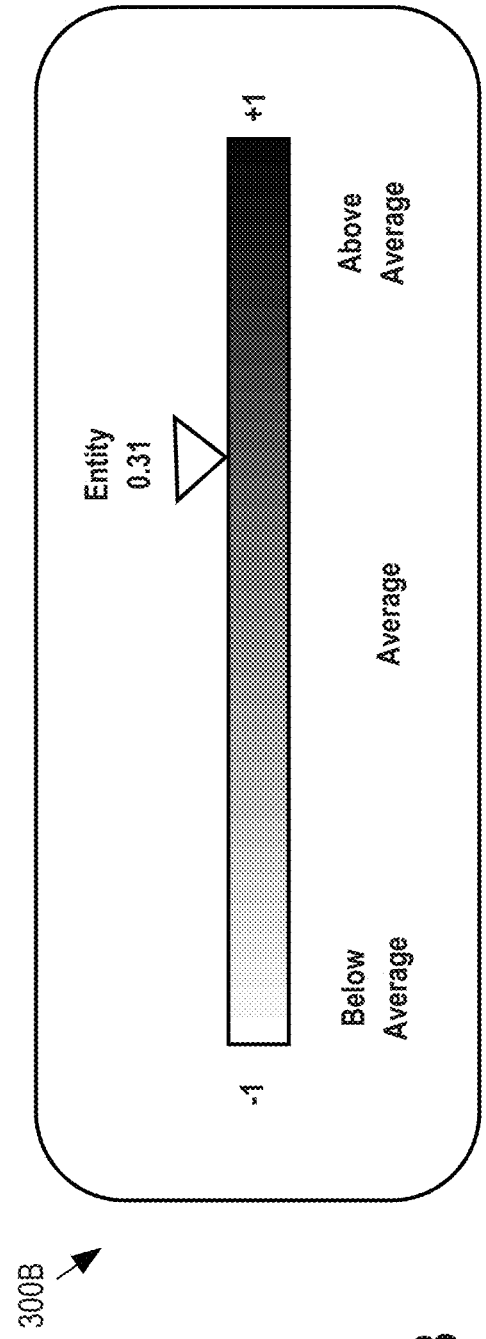

FIGS. 3A and 3B are a screen captures 300A, 300B illustrating second actionable output, in an embodiment. FIG. 3A illustrates a graphical comparison of an entity's intrinsic score to the aggregate relativized score for the entity's peers. FIG. 3B illustrates a relativized score for the entity of FIG. 3A compared to a reference scale which represents similar scores computed for the entity' peers. In the examples of FIGS. 3A and 3B, the entity has performed above average when compared to its peers. A selection, for example by a touchscreen tap, of the graphical element representing the entity's score initiates a downstream process, in an embodiment.

Use Case: Negative Relativized Entity Score

FIGS. 4A and 4B are a screen captures illustrating second actionable output, in an embodiment. FIG. 4A illustrates an example of actionable output 400A, which includes a graphical comparison of an entity's intrinsic score to the aggregate relativized score for the entity's peers. FIG. 4B illustrates another example of actionable output 400B, which includes a relativized score for the entity of FIG. 4A compared to a reference scale which represents similar scores computed for the entity' peers. In the examples of FIGS. 4A and 4B, the entity has performed below average when compared to its peers. A selection, for example by a touchscreen tap, of the graphical element representing the entity's score initiates a downstream process, in an embodiment.

Benefits

Benefits that may be realized by at least some embodiments described herein include improving the accuracy and effectiveness of actionable output provided by procurement software and, more generally, enabling enhanced utilization of data analysis systems integrated with procurement systems through the incorporation of the above-described score calculation approaches.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
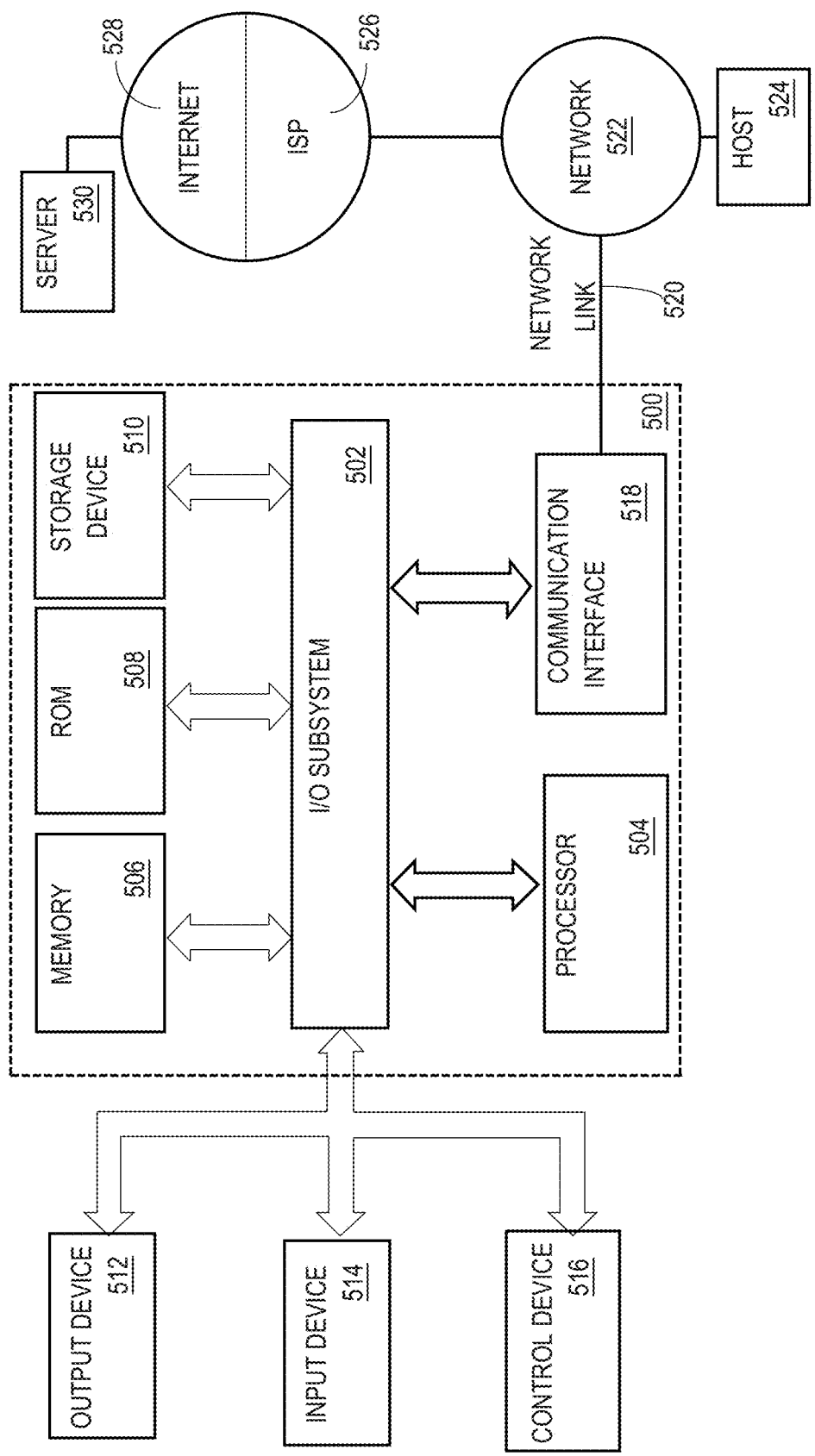
FIG. 5 is a block diagram that illustrates a computer system upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of the described below.

In an example 1, a method includes generating first actionable output that identifies a particular supplier and an intrinsic score for the particular supplier that is calculated using intrinsic factor data for the particular supplier, where the intrinsic factor data is obtained from a plurality of instances of procurement software; determining a set of weights using peer spend data of a set of peer suppliers, where the set of peer suppliers is identified based on a spend category that is associated with the peer spend data by an artificial intelligence-based process; applying the set of weights to a set of intrinsic scores for the set of peer suppliers to produce a set of peer scores, where a weight in the set of weights is calculated using the peer spend data; aggregating the set of peer scores to produce an aggregate peer score; generating second actionable output, where the second actionable output replaces or modifies or supplements the first actionable output based on a comparison of the intrinsic score for the particular supplier to the aggregate peer score, where the method is performed by one or more computing devices.

An example 2 includes the method of example 1, and the intrinsic factor data includes (i) dispute metric data, or (ii) overage metric data, or (iii) rejected invoice metric data, or (iv) a combination of (i) and (ii), or (v) a combination of (i) and (iii), or (vi) a combination of (ii) and (iii), or (vii) a combination of (i), (ii), and (iii). An example 3 includes the method of example 1 or example 2, where the intrinsic score is calculated as a weighted average of (i) dispute metric data and overage metric data or (ii) dispute metric data and rejected invoice metric data or (iii) dispute metric data and overage metric data and rejected invoice data. An example 4 includes the method of any of examples 1-3, where generating the first actionable output includes displaying a user interface element indicative of the intrinsic score for the particular supplier, and generating the second actionable output includes displaying a plurality of user interface elements indicative of the comparison of the intrinsic score for the particular supplier to the aggregate peer score. An example 5 includes the method of any of examples 1-4, where generating the second actionable output includes, in response to the comparison of the intrinsic score for the particular supplier to the aggregate peer score, (i) initiating an online approval process or (ii) calibrating risk score data or (iii) initiating an online questionnaire process or (iv) initiating an online opportunity notification process. An example 6 includes the method of any of examples 1-5, where generating the second actionable output includes generating an arrangement that includes a first graphical element representative of the intrinsic score for the particular supplier, a second graphical element representative of the aggregate peer score, and a third graphical element adjacent the first graphical element and the second graphical element, where the arrangement is representative of the comparison of the intrinsic score for the particular supplier to the aggregate peer score. An example 7 includes the method of any of examples 1-6, and includes generating a relative strength indicator for the particular supplier based on the comparison of the intrinsic score for the particular supplier to the aggregate peer score, where generating the second actionable output includes generating a display that includes a user interface element representative of the relative strength indicator for the particular supplier.

In an example 8, a computing system includes: one or more processors; one or more non-transitory storage media coupled to the one or more processors and storing instructions that, when executed by the one or more processors, cause: generating first actionable output that identifies a particular supplier and an intrinsic score for the particular supplier that is calculated using intrinsic factor data for the particular supplier, where the intrinsic factor data is obtained from a plurality of instances of procurement software; calculating a set of weights using peer spend data of a set of peer suppliers, where the set of peer suppliers is identified based on a product category that is associated with the peer spend data by an artificial intelligence-based process; applying the set of weights to a set of intrinsic scores for the set of peer suppliers to produce a set of peer scores, where a weight in the set of weights is calculated using the peer spend data; aggregating the set of peer scores to produce an aggregate peer score; generating second actionable output, where the second actionable output replaces or modifies or supplements the first actionable output based on a comparison of the intrinsic score for the particular supplier to the aggregate peer score.

An example 9 includes the computing system of example 8, where the intrinsic score is calculated as a weighted average of (i) dispute metric data and overage metric data or (ii) dispute metric data and rejected invoice metric data or (iii) dispute metric data and overage metric data and rejected invoice data. An example 10 includes the computing system of example 8 or example 9, where the instructions, when executed by the one or more processors, cause generating the first actionable output includes displaying a user interface element indicative of the intrinsic score for the particular supplier, and generating the second actionable output includes displaying an arrangement of user interface elements indicative of the comparison of the intrinsic score for the particular supplier to the aggregate peer score. An example 11 includes the computing system of any of examples 8-10, where the instructions, when executed by the one or more processors, cause generating the second actionable output includes, in response to the comparison of the intrinsic score for the particular supplier to the aggregate peer score, (i) initiating an online approval process or (ii) calibrating risk score data or (iii) initiating an online questionnaire process or (iv) initiating an online opportunity notification process. An example 12 includes the computing system of any of examples 8-11, where the instructions, when executed by the one or more processors, cause generating the second actionable output includes generating an arrangement that includes a first graphical element representative of the intrinsic score for the particular supplier, a second graphical element representative of the aggregate peer score, and a third graphical element adjacent the first graphical element and the second graphical element, where the arrangement is representative of the comparison of the intrinsic score for the particular supplier to the aggregate peer score. An example 13 includes the computing system of any of examples 8-12, where the instructions, when executed by the one or more processors, cause generating a relative strength indicator for the particular supplier based on the comparison of the intrinsic score for the particular supplier to the aggregate peer score, where generating the second actionable output includes generating a display that includes a user interface element representative of the relative strength indicator for the particular supplier.

In an example 14, a computer program product includes instructions embodied in one or more non-transitory storage media which, when executed by one or more processors, cause the one or more processors to perform operations comprising: generating first actionable output that identifies a particular supplier and an intrinsic score for the particular supplier that is calculated using intrinsic factor data for the particular supplier, where the intrinsic factor data is obtained from a plurality of instances of procurement software; calculating a set of weights using peer spend data of a set of peer suppliers, where the set of peer suppliers is identified based on a product category that is associated with the peer spend data by an artificial intelligence-based process; applying the set of weights to a set of intrinsic scores for the set of peer suppliers to produce a set of peer scores, where a weight in the set of weights is calculated using the peer spend data; aggregating the set of peer scores to produce an aggregate peer score; generating second actionable output, where the second actionable output replaces or modifies or supplements the first actionable output based on a comparison of the intrinsic score for the particular supplier to the aggregate peer score.

An example 15 includes the computer program product of example 14, where the intrinsic factor data includes (i) dispute metric data, or (ii) overage metric data, or (iii) rejected invoice metric data, or (iv) a combination of (i) and (ii), or (v) a combination of (i) and (iii), or (vi) a combination of (ii) and (iii), or (vii) a combination of (i), (ii), and (iii). An example 16 includes the computer program product of example 14 or example 15, where the intrinsic score is calculated as a weighted average of (i) dispute metric data and overage metric data or (ii) dispute metric data and rejected invoice metric data or (iii) dispute metric data and overage metric data and rejected invoice data. An example 17 includes the computer program product of any of examples 14-16, where the instructions, when executed by the one or more processors, cause generating the first actionable output includes displaying a user interface element indicative of the intrinsic score for the particular supplier, and generating the second actionable output includes displaying an arrangement of user interface elements indicative of the comparison of the intrinsic score for the particular supplier to the aggregate peer score. An example 18 includes the computer program product of any of examples 14-17, where generating the second actionable output includes, in response to the comparison of the intrinsic score for the particular supplier to the aggregate peer score, (i) initiating an online approval process or (ii) calibrating risk score data or (iii) initiating an online questionnaire process or (iv) initiating an online opportunity notification process. An example 19 includes the computer program product of any of examples 14-18, where the instructions, when executed by the one or more processors, cause generating the second actionable output includes generating an arrangement that includes a first graphical element representative of the intrinsic score for the particular supplier, a second graphical element representative of the aggregate peer score, and a third graphical element adjacent the first graphical element and the second graphical element, where the arrangement is representative of the comparison of the intrinsic score for the particular supplier to the aggregate peer score. An example 20 includes the computer program product of any of examples 14-19, where the instructions, when executed by the one or more processors, cause generating a relative strength indicator for the particular supplier based on the comparison of the intrinsic score for the particular supplier to the aggregate peer score, where generating the second actionable output includes generating a display that includes a user interface element representative of the relative strength indicator for the particular supplier.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    generating first actionable output that identifies a particular supplier and an intrinsic score for the particular supplier that is calculated using intrinsic factor data for the particular supplier, wherein the intrinsic factor data is obtained from a plurality of instances of procurement software;
    determining a set of weights using peer spend data of a set of peer suppliers, wherein the set of peer suppliers is identified based on a spend category that is associated with the peer spend data by an artificial intelligence-based process;
    applying the set of weights to a set of intrinsic scores for the set of peer suppliers to produce a set of peer scores, wherein a weight in the set of weights is calculated using the peer spend data;
    aggregating the set of peer scores to produce an aggregate peer score;
    generating second actionable output, wherein the second actionable output replaces or modifies or supplements the first actionable output based on a comparison of the intrinsic score for the particular supplier to the aggregate peer score, wherein the method is performed by one or more computing devices.

2. The method of claim 1, wherein the intrinsic factor data comprises (i) dispute metric data, or (ii) overage metric data, or (iii) rejected invoice metric data, or (iv) a combination of (i) and (ii), or (v) a combination of (i) and (iii), or (vi) a combination of (ii) and (iii), or (vii) a combination of (i), (ii), and (iii).

3. The method of claim 1, wherein the intrinsic score is calculated as a weighted average of (i) dispute metric data and overage metric data or (ii) dispute metric data and rejected invoice metric data or (iii) dispute metric data and overage metric data and rejected invoice data.

4. The method of claim 1, wherein generating the first actionable output comprises displaying a user interface element indicative of the intrinsic score for the particular supplier, and generating the second actionable output comprises displaying a plurality of user interface elements indicative of the comparison of the intrinsic score for the particular supplier to the aggregate peer score.

5. The method of claim 1, wherein generating the second actionable output comprises, in response to the comparison of the intrinsic score for the particular supplier to the aggregate peer score, (i) initiating an online approval process or (ii) calibrating risk score data or (iii) initiating an online questionnaire process or (iv) initiating an online opportunity notification process.

6. The method of claim 1, wherein generating the second actionable output comprises generating an arrangement that includes a first graphical element representative of the intrinsic score for the particular supplier, a second graphical element representative of the aggregate peer score, and a third graphical element adjacent the first graphical element and the second graphical element, wherein the arrangement is representative of the comparison of the intrinsic score for the particular supplier to the aggregate peer score.

7. The method of claim 1, comprising generating a relative strength indicator for the particular supplier based on the comparison of the intrinsic score for the particular supplier to the aggregate peer score, wherein generating the second actionable output comprises generating a display that includes a user interface element representative of the relative strength indicator for the particular supplier.

8. A computing system comprising:
one or more processors;
one or more non-transitory storage media coupled to the one or more processors and storing instructions that, when executed by the one or more processors, cause:
generating first actionable output that identifies a particular supplier and an intrinsic score for the particular supplier that is calculated using intrinsic factor data for the particular supplier, wherein the intrinsic factor data is obtained from a plurality of instances of procurement software;
calculating a set of weights using peer spend data of a set of peer suppliers, wherein the set of peer suppliers is identified based on a product category that is associated with the peer spend data by an artificial intelligence-based process;
applying the set of weights to a set of intrinsic scores for the set of peer suppliers to produce a set of peer scores, wherein a weight in the set of weights is calculated using the peer spend data;
aggregating the set of peer scores to produce an aggregate peer score;
generating second actionable output, wherein the second actionable output replaces or modifies or supplements the first actionable output based on a comparison of the intrinsic score for the particular supplier to the aggregate peer score.

9. The computing system of claim 8, wherein the intrinsic score is calculated as a weighted average of (i) dispute metric data and overage metric data or (ii) dispute metric data and rejected invoice metric data or (iii) dispute metric data and overage metric data and rejected invoice data.

10. The computing system of claim 8, wherein the instructions, when executed by the one or more processors, cause generating the first actionable output comprises displaying a user interface element indicative of the intrinsic score for the particular supplier, and generating the second actionable output comprises displaying an arrangement of user interface elements indicative of the comparison of the intrinsic score for the particular supplier to the aggregate peer score.

11. The computing system of claim 8, wherein the instructions, when executed by the one or more processors, cause generating the second actionable output comprises, in response to the comparison of the intrinsic score for the particular supplier to the aggregate peer score, (i) initiating an online approval process or (ii) calibrating risk score data or (iii) initiating an online questionnaire process or (iv) initiating an online opportunity notification process.

12. The computing system of claim 8, wherein the instructions, when executed by the one or more processors, cause generating the second actionable output comprises generating an arrangement that includes a first graphical element representative of the intrinsic score for the particular supplier, a second graphical element representative of the aggregate peer score, and a third graphical element adjacent the first graphical element and the second graphical element, wherein the arrangement is representative of the comparison of the intrinsic score for the particular supplier to the aggregate peer score.

13. The computing system of claim 8, wherein the instructions, when executed by the one or more processors, cause generating a relative strength indicator for the particular supplier based on the comparison of the intrinsic score for the particular supplier to the aggregate peer score, wherein generating the second actionable output comprises generating a display that includes a user interface element representative of the relative strength indicator for the particular supplier.

14. A computer program product comprising instructions embodied in one or more non-transitory storage media which, when executed by one or more processors, cause the one or more processors to perform operations comprising:
generating first actionable output that identifies a particular supplier and an intrinsic score for the particular supplier that is calculated using intrinsic factor data for the particular supplier, wherein the intrinsic factor data is obtained from a plurality of instances of procurement software;
calculating a set of weights using peer spend data of a set of peer suppliers, wherein the set of peer suppliers is identified based on a product category that is associated with the peer spend data by an artificial intelligence-based process;
applying the set of weights to a set of intrinsic scores for the set of peer suppliers to produce a set of peer scores, wherein a weight in the set of weights is calculated using the peer spend data;
aggregating the set of peer scores to produce an aggregate peer score;
generating second actionable output, wherein the second actionable output replaces or modifies or supplements the first actionable output based on a comparison of the intrinsic score for the particular supplier to the aggregate peer score.

15. The computer program product of claim 14, wherein the intrinsic factor data comprises (i) dispute metric data, or (ii) overage metric data, or (iii) rejected invoice metric data, or (iv) a combination of (i) and (ii), or (v) a combination of (i) and (iii), or (vi) a combination of (ii) and (iii), or (vii) a combination of (i), (ii), and (iii).

16. The computer program product of claim 14, wherein the intrinsic score is calculated as a weighted average of (i) dispute metric data and overage metric data or (ii) dispute metric data and rejected invoice metric data or (iii) dispute metric data and overage metric data and rejected invoice data.

17. The computer program product of claim 14, wherein the instructions, when executed by the one or more processors, cause the one or more processors to perform operations comprising generating the first actionable output comprises displaying a user interface element indicative of the intrinsic score for the particular supplier, and generating the second actionable output comprises displaying an arrangement of user interface elements indicative of the comparison of the intrinsic score for the particular supplier to the aggregate peer score.

18. The computer program product of claim 14, wherein generating the second actionable output comprises, in response to the comparison of the intrinsic score for the particular supplier to the aggregate peer score, (i) initiating an online approval process or (ii) calibrating risk score data or (iii) initiating an online questionnaire process or (iv) initiating an online opportunity notification process.

19. The computer program product of claim 14, wherein the instructions, when executed by the one or more processors, cause the one or more processors to perform operations comprising generating the second actionable output comprises generating an arrangement that includes a first graphical element representative of the intrinsic score for the particular supplier, a second graphical element representative of the aggregate peer score, and a third graphical element adjacent the first graphical element and the second graphical element, wherein the arrangement is representative of the comparison of the intrinsic score for the particular supplier to the aggregate peer score.

20. The computer program product of claim 14, wherein the instructions, when executed by the one or more processors, cause the one or more processors to perform operations comprising generating a relative strength indicator for the particular supplier based on the comparison of the intrinsic score for the particular supplier to the aggregate peer score, wherein generating the second actionable output comprises generating a display that includes a user interface element representative of the relative strength indicator for the particular supplier.

* * * * *